United States Patent [19]

Hammond

[11] 4,185,735
[45] Jan. 29, 1980

[54] POWERED PAN CONVEYOR

[76] Inventor: Theodore A. Hammond, 3575 - 52nd St., SE., Kentwood, Mich. 49508

[21] Appl. No.: 833,585

[22] Filed: Sep. 15, 1977

[51] Int. Cl.² ........................................... B65G 13/071
[52] U.S. Cl. .................................. 198/789; 64/30 R; 74/202
[58] Field of Search ............... 198/780, 781, 787, 789, 198/791, 842, 843; 64/30 R, 30 D, 30 E; 74/202, 206

[56] References Cited

U.S. PATENT DOCUMENTS

| | | | |
|---|---|---|---|
| 896,172 | 8/1908 | Thomas | 198/789 |
| 3,240,315 | 3/1966 | Dressler et al. | 198/780 |
| 3,667,589 | 6/1972 | Constable | 198/789 |
| 3,696,912 | 10/1972 | Fleischauer et al. | 198/781 |
| 3,729,088 | 4/1973 | Stein et al. | 198/855 |
| 3,729,088 | 4/1973 | Stein et al. | 198/781 |
| 3,753,485 | 8/1973 | Fromme et al. | 198/781 |
| 3,810,538 | 5/1974 | Moyes | 198/781 |
| 3,826,351 | 7/1974 | Fromme | 198/787 |
| 3,840,110 | 10/1974 | Molt et al. | 198/781 |
| 3,961,700 | 6/1976 | Fleischauer | 198/781 |
| 4,015,706 | 4/1977 | Goffedo et al. | 198/780 |

FOREIGN PATENT DOCUMENTS

| | | | |
|---|---|---|---|
| 2139790 | 2/1973 | Fed. Rep. of Germany | 198/787 |
| 32033 | 12/1911 | Sweden | 198/780 |
| 35154 | 7/1913 | Sweden | 198/780 |

*Primary Examiner*—Jeffrey V. Nase
*Attorney, Agent, or Firm*—Blanchard, Flynn, Thiel, Boutell & Tanis

[57] ABSTRACT

An improved drive mechanism for a powered pan conveyor wherein a rotatable line shaft extends longitudinally of the conveyor in transverse relationship to a plurality of uniformly spaced roller assemblies. Each roller assembly includes a support axle which extends between and is rotatably supported on a pair of side frames, and a pair of flanged rollers are nonrotatably secured to the support axle in spaced relationship therealong, whereby the flanged rollers drivingly support and drivingly confine an object such as a pan or pallet therebetween. The line shaft has enlarged driving collars thereon which, in a preferred embodiment, comprise sleeves which are axially shiftable relative to the line shaft and cooperate with the respective roller assemblies. Each sleeve has an external driving surface, preferably of a conical configuration, which is axially shiftable into frictional driving engagement with an annular axially directed surface formed on an end of one flanged roller for causing frictional driving of the respective roller assembly.

13 Claims, 4 Drawing Figures

POWERED PAN CONVEYOR

FIELD OF THE INVENTION

This invention relates to an improved powered conveyor of the type using opposed pairs of flanged rollers for supporting relatively flat objects, such as pallets or pans, and in particular to an improved driving mechanism for positively rotating the rollers.

BACKGROUND OF THE INVENTION

Known powered roller conveyors used for conveying large flat objects, such as luggage trays utilized at airports, have conventionally utilized a plurality of belt-driven rollers. These conveyors, however, have necessarily required substantial guide structure in order to properly confine the moving trays, which guide structure becomes particularly complex when the conveyor involves curved sections.

In an attempt to improve upon such tray conveyors, it has been proposed (see U.S. Pat. Nos. 3,753,485 and 3,826,351) to utilize flanged rollers which provide not only the support and driving engagement with the trays, but also function as guide or alignment members for confining the trays during their movement along the conveyor. While the conveyors of these latter-mentioned patents provide for more positive control over the trays due to the manner in which the flanged rollers confine the tray therebetween, nevertheless the conveyors of these patents possess many of the same deficiencies possessed by the other known pan coveyors in that they utilize an extremely complex drive arrangement involving a plurality of belts, particularly twisted belts, for driving the individual roller shafts. This type of driving arrangement is undesirably complex and, under some conditions, requires an undesirable amount of maintenance and repair.

Accordingly, it is an object of the present invention to provide an improved powered pan conveyor which overcomes the above-mentioned disadvantages and, in particular, utilizes an improved simplified drive mechanism so as to result in a more compact and economical structure, and which drive mechanism results in substantially improved conveyor performance while requiring substantially less maintenance and repair.

It is also an object of the invention to provide an improved pan conveyor, as aforesaid, which utilizes a pair of flanged rollers for simplifying both the driving of the conveyor and the positive guiding of the conveyed objects. At least one roller of each pair is positively frictionally driven by and comprises a part of the improved drive mechanism, with the roller being directly frictionally driven from a rotatable line shaft which extends longitudinally of the conveyor, whereby the flanged rollers are positively controlled and driven in a simplified manner.

A further object of the invention is to provide an improved pan conveyor, as aforesaid, which incorporates the improved drive mechanism, with the latter being highly suitable for use not only in straight conveyor sections but also in curved conveyor sections. This improved drive mechanism is also highly desirable for conveyors having a plurality of individually controlled zones of rollers spaced longitudinally thereof for permitting accumulation of articles on the conveyor.

In the following discussion, while reference is made to a "pan" or "tray", it will be appreciated that the conveyor of this invention is highly desirable for use on many different types of articles having a relatively large flat bottom surface, particularly pallets and the like, and reference to "tray" or "pan" will encompass such other articles.

Other objects and purposes of the invention will be apparent to persons familiar with conveyors of this general type upon reading the following specification and inspecting the accompanying drawings.

Figure 1:
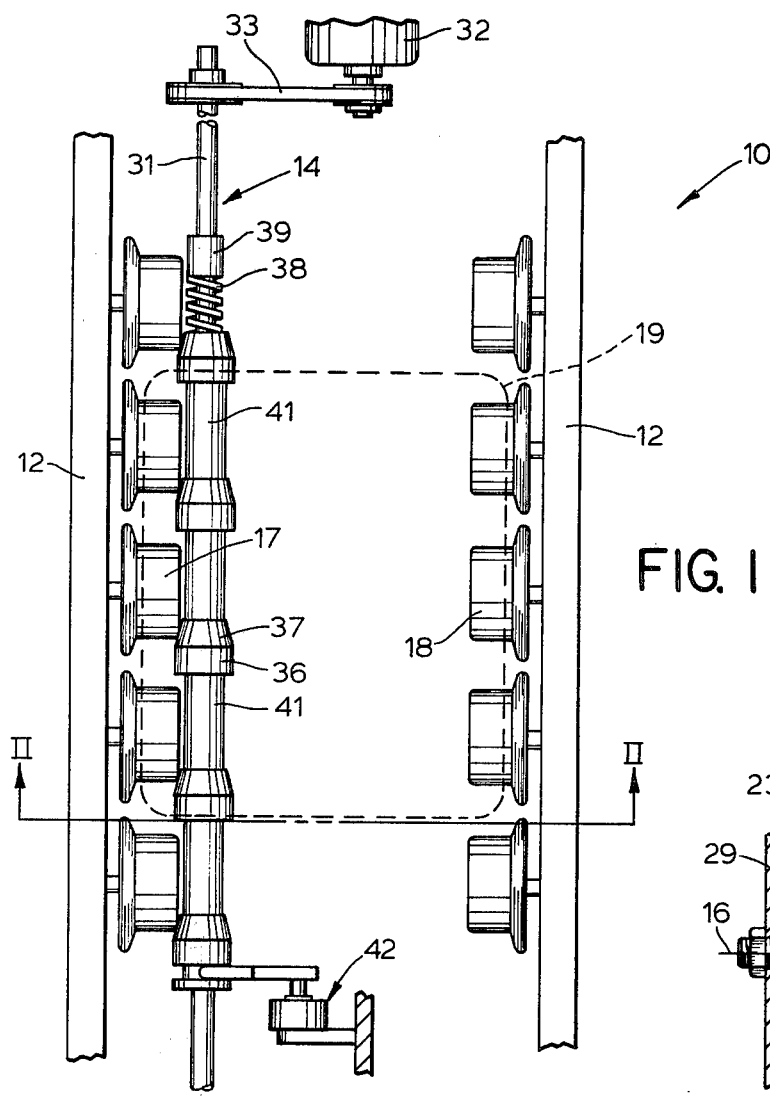
FIG. 1 is a fragmentary top view of a powered pan conveyor according to the present invention.
Figure 4:
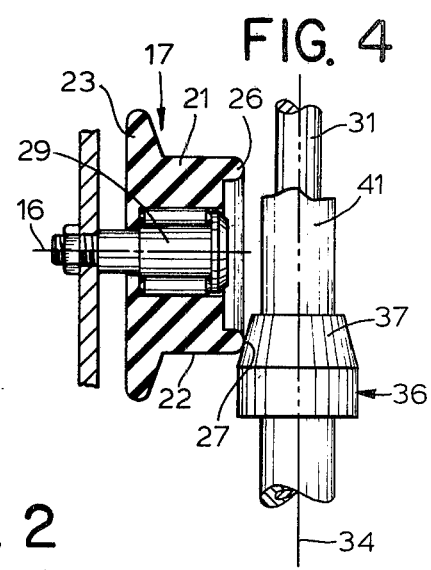
FIG. 4 is an enlarged fragmentary sectional view taken substantially along the line IV—IV in FIG. 2.
Figure 2:
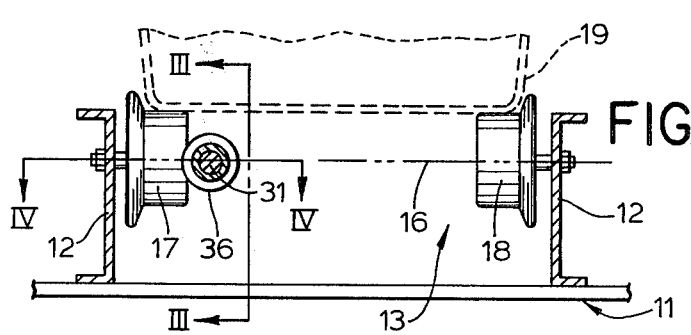
FIG. 2 is a sectional view taken along line II—II in FIG. 1.
Figure 3:
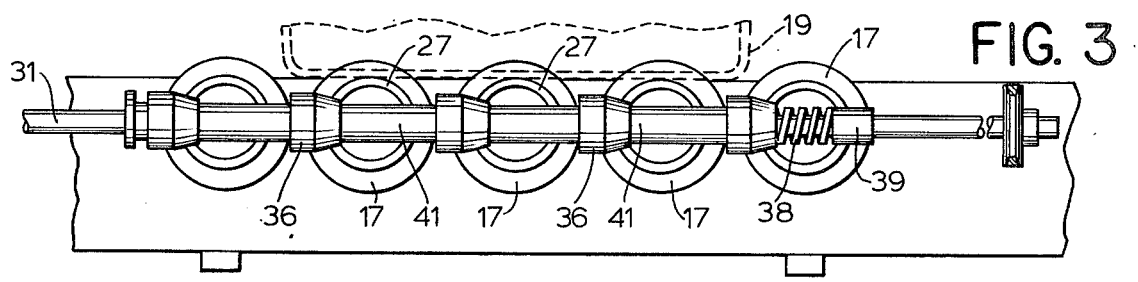
FIG. 3 is a fragmentary view, partially in cross section, taken along line III—III in FIG. 2.

Certain terminology will be used in the following description for convenience in reference only and will not be limiting. For example, the words "upwardly", "downwardly", "rightwardly", and "leftwardly" will refer to directions in the drawings to which reference is made. The word "forwardly" will refer to the normal movement direction of articles along the conveyor. The words "inwardly" and "outwardly" will refer to directions toward and away from, respectively, the geometric center of the conveyor and designated parts thereof. Said terminology will include the words specifically mentioned, derivatives thereof, and words of similar import.

SUMMARY OF THE INVENTION

The objects and purposes of the present invention, including those mentioned above, are provided by an improved drive mechanism for a powered pan conveyor wherein a rotatable line shaft extends longitudinally of the conveyor in transverse relationship to a plurality of uniformly spaced roller assemblies. Each roller assembly includes a pair of coaxially aligned flanged rollers which are rotatably supported on a pair of side frames, whereby the flanged rollers drivingly support and confine an object such as a pan or pallet therebetween. The line shaft has enlarged driving collars thereon which, in a preferred embodiment, comprise sleeves which are axially shiftable relative to the line shaft and cooperate with the respective roller assemblies. Each sleeve has an external driving surface, preferably of a conical configuration, which is axially shiftable into frictional driving engagement with an annular axially directed surface formed on an end of one flanged roller for causing frictional driving of the respective roller assembly. The flanged roller and the shiftable drive sleeve are each preferably constructed, at least partially, of a deformable plastic material having a high friction coefficient.

DETAILED DESCRIPTION

FIGS. 1-4 illustrate a powered pan conveyor 10 having a frame 11 which includes a pair of spaced upwardly projecting siderails 12. A plurality of substantially parallel, uniformly spaced roller assemblies 13 extend between and are rotatably supported on the siderails 12. A line shaft drive means 14 is drivingly interconnected to the roller assemblies 13 for causing a positive powered rotation thereof.

Each roller assembly 13 comprises a pair of substantially identical coaxially aligned support rollers or wheels 17 and 18 which are rotatable about the axis 16 which extends horizontally and perpendicularly between the spaced siderails 12. The rollers 17 and 18 are positioned in opposed axially spaced relationship so as to rollingly and drivingly support thereon a suitable object 19 which is to be conveyed along the conveyor, which object may comprise a tray, pallet or similar object having a large substantially flat bottom surface.

The roller 17, and its identical counterpart 18, includes a substantially cylindrical body portion 21 which defines an outer cylindrical surface 22 which functions both as a supporting and frictional driving surface for the tray 19. An enlarged annular tread 23 is positioned adjacent the outer axial end of the roller and projects radially outwardly beyond the cylindrical surface 22 for defining an annular flange which functions as a guiding and alignment structure for the tray 19 as same is conveyed along the conveyor. A further annular tread 26 is formed adjacent the inner axial end of the roller, which tread 26 projects axially outwardly from the roller and defines an outer annular driving surface 27. The cylindrical body portion 21 is rotatably supported on an axle or shaft 29 which is fixed to the adjacent siderail 12.

The above-described roller 17 is driven from the line shaft means 14, the latter including an elongated rotatable line shaft 31 which extends longitudinally of the conveyor in substantially perpendicular relationship to the roller assemblies 13 and is rotatable about the axis 34, which axis 34 is substantially perpendicular to and intersects the axes 16. This line shaft 31 is rotatably driven in any conventional manner, as by means of a motor 32 through an intermediate belt drive 33.

The line shaft 31 is of a stepped configuration which, in the illustrated embodiment, is achieved by mounting enlarged sleevelike drive collars 36 on the shaft 31. These collars 36 are spaced axially along the shaft 31 so as to be positioned for engagement with the rollers 17. The collars 36 are rotatable with the shaft 31 and are adapted to create a frictional driving engagement with the driving surface 27 formed on the rollers 17.

In the illustrated embodiment, the collars 36 are provided with an exterior truncated conical surface 37 which is adapted to be moved into frictional driving engagement with the driving surface 27. The collars 36 are axially slidably supported on the shaft 31 and are normally urged axially of the shaft (downwardly in FIG. 1) into a disengaged position by means of a compression spring 38 which surrounds the shaft and reacts between a stationary stop 39 and one of the collars 36. Several of the axially adjacent collars 36 are suitably spaced by slidable sleevelike spacers 41 which slidably surround the shaft and hence insure that the series of collars are thus simultaneously axially shifted in response to the urging of the spring 38. The series of collars 36 are shifted into frictional driving engagement with the rollers 17 by means of a conventional actuator 42, which may comprise a pneumatic actuator, which thereby causes axial shifting of the collars 36 (upwardly in FIG. 1) in opposition to the urging of the spring 38.

The collars 36 and the drive rollers 17 and 18 are preferably constructed of a plastic material having a high friction coefficient, as by being molded in one piece of polyurethane. This construction thus results in the driving members, and particularly the annular tread 26 on the rollers 17, being able to sufficiently resiliently deform as to create a desirable frictional engagement with the conical surface 37 on the collar 36 so as to result in a secure yet substantially slip-free frictional drive of the roller assembly.

In addition, by constructing the collars 36 of a plastic material having some deformation capability, such as polyurethane, the collars 36 can thus be snugly fitted on the shaft 31 so as to be axially slidable and, when shifted into frictional driving engagement with the rollers 17, this creates sufficient deformation of the collars as to result in their secure gripping engagement with the shaft 31 so as to permit transmission of the desired driving torque from the shaft to the collars and thence to the flanged rollers. However, if necessary, the collars 36 can obviously be keyed to the shaft so as to prevent relative rotation therebetween.

If desired, the roller 17 can be of a conventional rigid material, with only the tread 26 being of plastic material (i.e., polyurethane).

OPERATION

When transporting of pans or objects 19 along the conveyor is desired, these objects will rest upon the opposed pairs of rollers 17–18 and will be conveyed longitudinally of the conveyor due to the powered rotation of the rollers 17. To effect such rotatation, the actuator 42 is energized to shift the driving collars 36 into the illustrated position, wherein the conical surfaces 37 engages the axial annular driving surfaces 27 formed on the rollers 17, thereby creating a snug and secure frictional driving engagement therebetween. Since the shaft 31 can be rotated continuously, the axial shifting of the collars into driving engagement with the rollers 17 thus results in powered rotation of the rollers 17, whereby the pans 19 are thus conveyed along the conveyor. In addition to the advantageous characteristics achieved by forming the collars and rollers from polyurethane or a similar material, as described above, this also results in the creation of a secure frictional driving engagement with the lower surface of the pans 19 so as to insure a positive substantially slip-free movement of these pans along the conveyor. In addition, the flanged construction of the rollers 17 and 18 provides for positive guided confinement of the articles 19 so that they will thus move along the conveyor while being properly guided and confined. In addition, the flanged rollers can also be provided throughout a curved conveyor section so as to provide the desired confinement and guiding of the pans as they move through a curve.

While not illustrated in the drawings, it is conventional to divide a powered roller conveyor into a plurality of separately controlled zones which are spaced longitudinally along the conveyor. These zones, each of which contains a selected number of conveyor rollers, are individually drivingly controlled so that the articles or objects can be conveyed and stored on the conveyor without developing excessive contact forces between the stopped articles. This zoning permits what is commonly referred to as "zero pressure accumulation" of articles on the conveyor.

The driving arrangement of the present invention is particularly suitable for permitting zoning of a powered pan conveyor since, as illustrated in FIG. 1, this invention permits the simultaneous driving of a selected number of conveyor rollers within a zone, such as the five roller assemblies 13 illustrated in FIG. 1. Several such zones of conveyor rollers can be disposed in series along the longitudinal direction of the conveyor, with each of these zones being individually controlled by means of a separate actuator 42, whereby a common continuously rotatable drive shaft 31 can thus extend longitudinally through all of the zones whereby the rollers of the individual zones are rotatably driven due to the shiftable series of collars associated with each zone.

This zoning concept is conventional, and is also disclosed in greater detail in Applicant's copending application Ser. No. 833,584, entitled "LINE SHAFT DRIVE FOR ROLLER CONVEYOR", filed concurrently herewith, so that further detailed discussion of same is not believed necessary. The present invention is highly desirable for use with zoning due to the extremely simple manner in which the driving torque is transmitted from the line shaft to the roller assemblies, and the simplified manner in which a clutchable driving engagement can be achieved.

It will be appreciated that, in some instances, the collars can be axially fixed with the shaft, and the complete shaft then shifted axially so as to achieve a clutchable relationship with the roller assemblies. Further, where disengagement between the driving collars and the rollers is not necessary, then the collars can again be fixed to or integral with the line shaft and thus disposed in continuous driving engagement with the flanged rollers, whereby driving control is thus achieved solely by rotatably driving or stopping the line shaft. Particularly with this latter arrangement, the collars need not be provided with a conical or tapered exterior surface.

When the loads 19 are relatively light, then driving only the rollers 17 is satisfactory. However, for heavy loads, then a second parallel line shaft means 14 may be provided for directly frictionally driving the other rollers 18.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a powered roller conveyor having stationary frame means including a pair of spaced elongated side frames extending longitudinally of the conveyor, a plurality of roller assemblies supported on the frame means and being spaced apart at regular longitudinal intervals, each said roller assembly including axle means mounted on the side frames and a pair of opposed coaxially aligned flanged conveyor wheels mounted on the axle means, the flanged wheels of each opposed pair being axially spaced apart and disposed with their radial flanges facing away from each other so that the conveyor wheels provide points of support for a relatively flat-bottomed object which is to be conveyed along the conveyor, the radial flanges on said wheels providing lateral guidance for the object, and drive means for simultaneously driving at least a group of said roller assemblies, said drive means including an elongated rotatable line shaft extending longitudinally of said conveyor and drivingly connected to motor means, comprising the improvement wherein said axle means includes a pair of coaxially aligned stub shafts which are respectively mounted on and project outwardly from said side frames in cantilevered relationship, the pair of opposed flanged wheels being supported on the pair of coaxially aligned stub shafts, said line shaft extending continuously throughout said group of roller assemblies and being disposed between the flanged wheels defining the opposed pairs, said line shaft being positioned with its rotational axis extending substantially perpendicular to and substantially intersecting the rotational axes of said roller assemblies, the flanged wheels as associated with one of said side frames having substantially axially-directed annular driving surfaces formed on the inner axial end portions thereof, said line shaft including a plurality of radially enlarged hubs spaced axially therealong and having substantially radially-directed peripheral annular drive surfaces extending concentrically of the rotational axis of said line shaft, the annular drive surfaces on said hubs being disposed in direct frictional driving engagement with the annular driving surfaces formed on the inner axial end portions of the flanged wheels associated with said one side frame, said hubs comprising sleeves which concentrically surround said line shaft and have a rotatable slip fit therewith, the engagement of the flanged wheel with the respective sleeve exerting sufficient pressure against the latter so that a rotatable frictional driving engagement is created between said sleeve and said line shaft.

2. A conveyor according to claim 1, wherein the flanged wheels associated with the other side frame are freely rotatably supported and are not drivingly connected to a power source.

3. A conveyor according to claim 1, wherein said flanged wheel has an annular portion disposed adjacent the inner axial end thereof which defines said annular driving surface and which is constructed of a high-friction plastic material which permits at least limited surface deformation for creating a high friction and substantially slip-free engagement between the flanged wheel and the respective hub.

4. In a powered roller conveyor including a plurality of roller assemblies supported on a frame, the roller assemblies being spaced apart at regular longitudinal intervals, each roller assembly including a drive wheel having an annular flange projecting radially thereof, and drive means for simultaneously driving at least a group of said flanged drive wheels, said drive means including an elongated rotatable line shaft extending longitudinally of said conveyor and drivingly connected to motor means, comprising the improvement wherein said line shaft includes a plurality of radially enlarged hub portions each having a peripheral drive surface extending concentrically of the rotational axis of said line shaft, each of the drive wheels having an annular driving surface formed thereon and disposed in direct frictional driving engagement with the peripheral drive surface on the respective hub portion for causing rotation of the respective wheel, said plurality of hub portions comprising annular sleeves axially slidably supported on said line shaft, spacer means axially movably supported relative to said line shaft and coacting between axially adjacent sleeves, and actuating means coacting with said series of sleeves for simultaneously controlling the movement thereof axially of the line shaft between axially spaced positions wherein the sleeves are respectively engaged with and disengaged from the flanged drive wheels.

5. A conveyor according to claim 4, wherein the annular driving surface as associated with said drive wheel is substantially axially directed.

6. A conveyor according to claim 4, wherein each said roller assembly includes a pair of said flanged drive wheels associated therewith in opposed relationship to one another, one of the flanged drive wheels of said pair being directly frictionally driven from one of the hub portions.

7. In a powered conveyor system having stationary frame means including a pair of spaced elongated side frames extending longitudinally of the conveyor, a plurality of roller assemblies supported on the frame means and being spaced apart at regular longitudinal intervals, each roller assembly including axle means mounted on the side frames and a pair of opposed coaxially aligned flanged drive wheels mounted on the axle means, the drive wheels being axially spaced apart and disposed with their flanges facing away from each other so that the wheels provide points of support for a relatively flat bottomed object which is to be conveyed along the conveyor, the flanges on said wheels providing lateral guidance for the object, and drive means for simultaneously driving at least a group of said roller assemblies, said drive means including an elongated rotatable line shaft extending longitudinally of said conveyor and drivingly connected to motor means, comprising the improvement wherein said line shaft includes a plurality of radially enlarged hub portions having a peripheral annular drive surface extending concentrically of the rotational axis of said line shaft, one of the wheels associated with at least some of said roller assemblies having an annular driving surface formed thereon, the annular drive surface on said hub portion being disposed in frictional driving engagement with the annular driving surface on the respective flanged wheel for causing rotation of the respective wheel, said plurality of hub portions comprising annular sleeves axially slidably supported on said line shaft, spacer means axially movably supported relative to said line shaft and coacting between axially adjacent sleeves, and actuating means coacting with said series of sleeves for controlling the movement thereof axially of the line shaft between axially spaced positions wherein the sleeves are respectively engaged with and disengaged from the flanged wheels.

8. A conveyor according to claim 7, wherein each said sleeve has an outer conical surface which defines said annular drive surface, and wherein the annular driving surface is formed on one axial end of the respective flanged wheel.

9. A conveyor according to claim 8, wherein said flanged wheel has an annular portion disposed adjacent an axial end thereof which defines said annular driving surface and which is constructed of a high-friction plastic material, said annular driving surface facing substantially axially of the respective flanged wheel, and said sleeve also being constructed of a high-friction plastic material, the plastic material of said sleeve and of said annular portion having at least limited elastic deformability.

10. A conveyor according to claim 9, wherein the flanged wheel is formed in one piece of polyurethane, and wherein said sleeve is also formed of polyurethane.

11. A conveyor according to claim 7, wherein said sleeve and the respective flanged wheel both are constructed of polyurethane so as to have at least limited surface deformation for creating a high friction and substantially slip-free engagement between the sleeve and the flanged wheel.

12. In a powered conveyor system having stationary frame means including a pair of spaced elongated side frames extending longitudinally of the conveyor, a plurality of roller assemblies supported on the frame means and being spaced apart at regular longitudinal intervals, each roller assembly including axle means mounted on the side frames and a pair of opposed coaxially aligned flanged drive wheels mounted on the axle means, the drive wheels being axially spaced apart and disposed with their flanges facing away from each other so that the wheels provide points of support for a relatively flat bottomed object which is to be conveyed along the conveyor, the flanges on said wheels providing lateral guidance for the object, and drive means for simultaneously driving at least a group of said roller assemblies, said drive means including an elongated rotatable line shaft extending longitudinally of said conveyor and drivingly connected to motor means, comprising the improvement wherein said line shaft includes a plurality of radially enlarged hub portions having a peripheral drive surface extending concentrically of the rotational axis of said line shaft, one of the wheels associated with at least some of said roller assemblies having an annular driving surface formed thereon, the annular drive surface on said hub portion being disposed in frictional driving engagement with the annular driving surface on the respective flanged wheel for causing rotation of the respective wheel, said plurality of hub portions comprising annular sleeves axially slidably supported on said line shaft, sleevelike spacer means slidably supported on said line shaft and positioned between adjacent sleeves, spring means coacting with at least one of said sleeves for resiliently urging the aligned series of sleeves axially of said line shaft into a position wherein the individual sleeves are disengaged from the respective flanged wheels, and actuating means coacting with said series of sleeves for moving same axially into engagement with the respective flanged wheels.

13. A conveyor according to claim 12, wherein said sleeve and the respective flanged wheel both are constructed of polyurethane so as to have at least limited surface deformation for creating a high friction and substantially slip-free engagement between the sleeve and the flanged wheel.

* * * * *